United States Patent [19]
Katsuta

[11] 3,921,438
[45] Nov. 25, 1975

[54] LOW TEMPERATURE LIQUID STORAGE TANK OF THE INTERNAL HEAT INSULATING TYPE HAVING CRACK DETECTING MEANS

[75] Inventor: Kihei Katsuta, Nagasaki, Japan

[73] Assignee: Mitsubishi Jukogyo Kabushiki Kaisha, Tokyo, Japan

[22] Filed: June 13, 1974

[21] Appl. No.: 479,144

[30] Foreign Application Priority Data
June 21, 1973 Japan.............................. 48-70212

[52] U.S. Cl.................. 73/40.7; 73/49.2; 220/9 LG
[51] Int. Cl.² ......................................... G01M 3/04
[58] Field of Search .......... 73/49.2, 40.7; 220/9 LG

[56] References Cited
UNITED STATES PATENTS
| | | | |
|---|---|---|---|
| 3,444,725 | 5/1969 | Chave................................... | 73/40.7 |
| 3,489,311 | 1/1970 | Folkerts et al................... | 73/49.2 X |
| 3,757,982 | 9/1973 | Isenberg et al.................. | 220/9 LG |

Primary Examiner—Charles A. Ruehl
Attorney, Agent, or Firm—Cushman, Darby and Cushman

[57] ABSTRACT

Low temperature liquid storage tank of the internal heat insulating type having crack detecting means. The tank is provided with a primary impermeable layer located on the inner wall of the tank shell with a heat insulating layer interposed therebetween. A second impermeable layer is provided in the interior of the heat insulating layer. A layer of gas permeable sheet material is provided on the low temperature side of the secondary impermeable layer as well as on the high temperature side of the secondary impermeable layer and a circulating gas feed pump and a gas analyzing device are connected through connecting lines to the layer of gas permeable sheet material at the low temperature side of the secondary impermeable layer as well as to the layer of gas permeable sheet material at the high temperature side of the secondary impermeable layer, so that leakage of the low temperature liquid in the tank through possible cracks in the impermeable layers is detected by the circulating gas fed to the gas analyzing device by the pump through the layer of gas permeable sheet material.

1 Claim, 4 Drawing Figures

LOW TEMPERATURE LIQUID STORAGE TANK OF THE INTERNAL HEAT INSULATING TYPE HAVING CRACK DETECTING MEANS

BACKGROUND OF THE INVENTION

The present invention relates to a low temperature liquid storage tank of the internal heat insulating type having crack detecting means for storage of low temperature liquid such as low temperature liquefied natural gas, wherein the tank shell is provided therein with inpermeable layers with the interposition of heat insulating layers and crack detecting means for detecting cracks possibly occurring in the tank shell, the heat insulating layers and the impermeable layers.

In a low temperature liquid storage tank of the internal heat insulating type, should a leakage of the low temperature liquid occur by cracks generated in the impermeable layers and the heat insulating layers, a portion of the tank shell adjacent to the portion where leakage occurs is extremely cooled so that low temperature brittleness might appear in the tank shell which leads to breakage of the tank shell. And, if cracks appear in the tank shell and the heat insulating layers, the heat insulating effect is deteriorated possibly leading to serious accident. However, no effective measure has been developed for detecting such a generation of cracks in a tank of the internal heat insulating type accurately and in a simple manner during the construction thereof, the usage thereof and at the time of intermediate inspection thereof, and the provision of such an effective measure has been desired.

SUMMARY OF THE INVENTION

The present invention aims at solving the above described demand for providing an effective device for detecting cracks possibly occurring in a tank of the type described above accurately and in a simple manner.

Therefore, the object of the present invention is to provide a novel and useful low temperature liquid storage tank of the internal heat insulating type having crack detecting means which can detect generation of cracks accurately and in a simple manner.

To achieve the above object, the low temperature liquid storage tank of the internal heat insulating type having crack detecting means constructed in accordance with the present invention comprises a primary impermeable layer located on the inner wall of the tank shell with a heat insulating layer interposed therebetween and a second impermeable layer provided in the interior of the heat insulating layer, the tank being characterized by the provision of a layer of gas permeable sheet material provided on the low temperature side of the secondary impermeable layer and on the high temperature side of the secondary impermeable layer, respectively, and a circulating gas feed pump and a gas analyzing device connected through connecting lines to the layer of gas permeable sheet material at the low temperature side of the secondary impermeable layer and to that at the high temperature side of said secondary impermeable layer, respectively.

By the construction of the tank of the present invention as described above, required gas can be fed by the pump and circulated in each of the layers of gas permeable sheet material at the respective sides of the secondary impermeable layer provided in the interior of the heat insulating layer so that the circulated gas can be applied to the gas analyzing device thereby permitting cracks possibly occurring at the low temperature side or the high temperature side of the secondary impermeable layer or cracks possibly occurring at the secondary impermeable layer itself to be simply and quickly detected while the existence or non-existence of cracks (including pinholes) in the various components of the tank at the completion of the tank, during the usage thereof and at the intermediate inspection thereof can be quickly and exactly detected. Therefore, the inspection of cracks in the low temperature liquid storage tank of the internal heat insulating type can be effectively carried out, thereby permitting the safety of the tank to be extremely improved.

DETAILED DESCRIPTION OF THE PREFERRED EMBODIMENT

Figure 1:
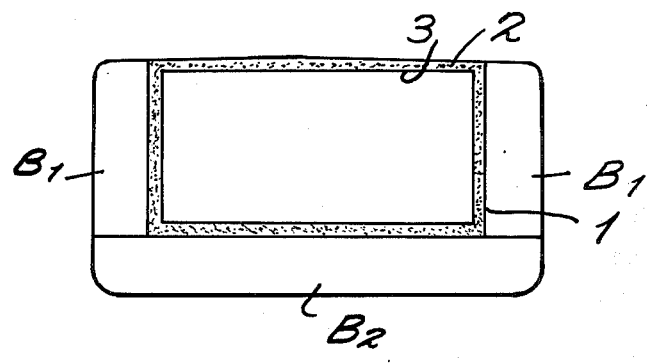
FIG. 1 is a schematic cross-sectional view showing the hull of a ship in which the low temperature liquid storage tank of the internal heat insulating type having crack detecting means of the present invention is provided.

Referring to FIG. 1, a primary impermeable layer 3 comprised of low temperature resistant material is provided on the inner wall of the tank shell 1 with a heat insulating layer 2 made of a material such as a foamed resin material being interposed between the tank shell 1 and the primary impermeable layer 3. Ballast tanks $B_1$ are provided at the ship's side, while a ballast tank $B_2$ is provided at the ship's bottom in the form of double walled construction.

Figure 2:
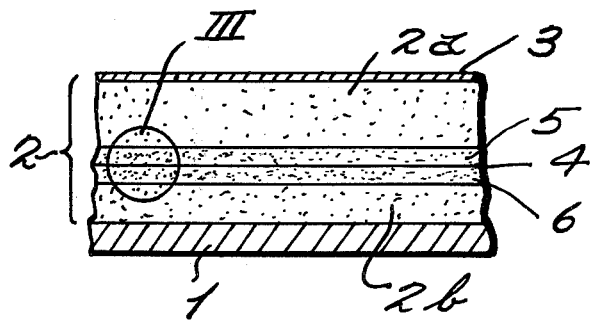
FIG. 2 is a fragmentary cross-sectional view in enlarged scale showing a portion of the above described low temperature liquid storage tank.

Referring now to FIG. 2, a secondary impermeable layer 4 is provided in the interior of the heat insulating layer 2 located between the tank shell 1 and the innermost primary impermeable layer 3. A primary layer 5 of gas permeable sheet material is located along the low temperature side of the secondary impermeable layer 4 while a secondary layer 6 of gas permeable sheet material is provided along the high temperature side of the secondary impermeable layer 4.

Figure 3:
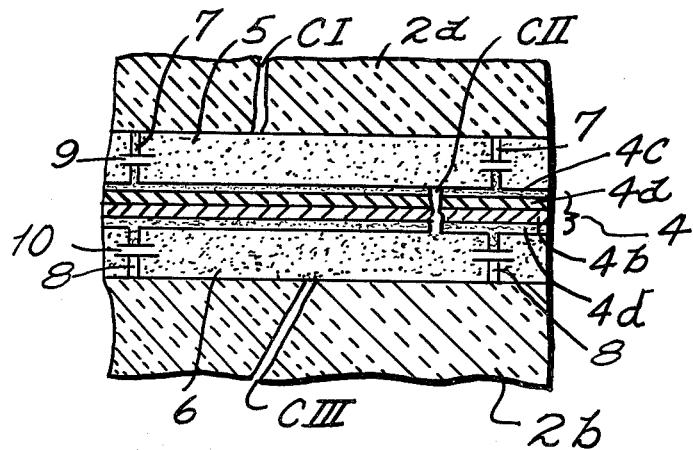
FIG. 3 is a cross-sectional view showing the portion encircled by a circle III in FIG. 2 in further enlarged scale.

Referring to FIG. 3 showing in detail the portion III in FIG. 2, the secondary impermeable layer 4 comprises a polyester resin layer 4a and an aluminum foil 4b laminated each other with impermeable adhesive layers 4c, 4d being applied to the outer surfaces of the laminated layers 4a and 4b, respectively. The primary layer 5 of gas permeable sheet material and the secondary layer 6 of gas permeable sheet material are bonded to each other by the interposition of the adhesive layers 4c, 4d.

A plurality of partitions 7 having therein communicating pipes 9, respectively, are provided in the layer 5 of gas permeable sheet material spaced an appropriate distance from each other at right angle to the adhesive layer 4c, while a plurality of partitions 8 having therein communicating pipes 10, respectively, are provided in the layer 6 of gas permeable sheet material spaced an appropriate distance from each other at right angle to the adhesive layer 4d in the similar manner as the partitions 7 in the layer 5.

The material forming the partitions 7, 8 may be an impermeable material similar to or different from that of the adhesive layers 4c, 4d.

The communicating pipes 9, 10 serve to communicate adjacent compartments in the layers 5, 6 divided by partitions 7, 8.

As to the material forming the ship shell 1, an ordinary steel for ship building may be employed which may have no low temperature resistant property. However, as to the material forming the primary impermeable layer 3 directly contacting with the low temperature liquid in the tank, a material capable of preventing permeation of low temperature liquid and the vapor thereof and capable of preventing generation of cracks when contacted with the low temperature liquid must be used such as a material having a high quality low temperature resistant property, such as a laminated material comprised of aluminum and polyester resin, a reinforced plastic material constructed by a resin such as polyurethane resin, silicone resin and epoxy resin and fibrous material such as glass fibers, carbon fibers, vegetable fibers or a fabric made of any of the above described fibers, and a film of tetrafluoride resin, for example.

As to the material for forming the primary heat insulating layer 2a and the secondary heat insulating layer 2b which are formed by dividing the heat insulating layer 2 by the secondary impermeable layer 4, an organic heat insulating material such as hard polyurethane foam, polyvinyl chloride foam, polysterene foam and polyethylene foam and an inorganic heat insulating material such as foamed glass and foamed concrete or wood may be employed. Particularly, as to the material for forming the primary heat insulating layer 2a, it is preferred to employ a material having a greater mechanical strength than that of the material forming the secondary heat insulating layer 2b so that generation of cracks due to thermal stresses is effectively prevented.

As to the material for making the primary layer 5 of gas permeable sheet material and the second layer 6 of gas permeable sheet material, a material which is made of soft polyurethane foam, rock fibers, porous synthetic resin plate or sintered material and is formed to have a required thickness for resisting loads given by the low temperature liquid and the heat insulating layers while no substantial difference in the permeation resistance is given in the material. In the case of soft polyurethane foam, supporting posts made of hard polyurethane foam are located in the soft polyurethane foam.

In constructing the above described low temperature liquid storage tank of the internal heat insulating type, inspection of leakage is carried out at the time of completion of the tank shell 1 constructed as the ship hull by watertight test and airtight test, so that any deficiency is avoided from the ship shell 1.

Then, the secondary heat insulating layer 2b is applied to the tank shell 1 and, thereafter, the blocks of the laminated layers comprised of the second layer 6 of gas permeable sheet material, the second impermeable layer 4 and the primary layer 5 of gas permeable sheet material which had been previously laminated each other at the factory are applied to the surface of the second heat insulating layer 2b block by block.

Alternatively, the laminated layers comprised of the second impermeable layer 4 and both the layers 5, 6 of gas permeable sheet material which had been previously laminated each other may be located a predetermined distance spaced from the tank shell 1 and foamable synthetic resin may be poured into the space between the tank shell 1 and the laminated layers located in spaced relationship from the tank shell 1 so as to permit the foamable resin to be foamed to construct the secondary heat insulating layer 2b within the space.

Figure 4:
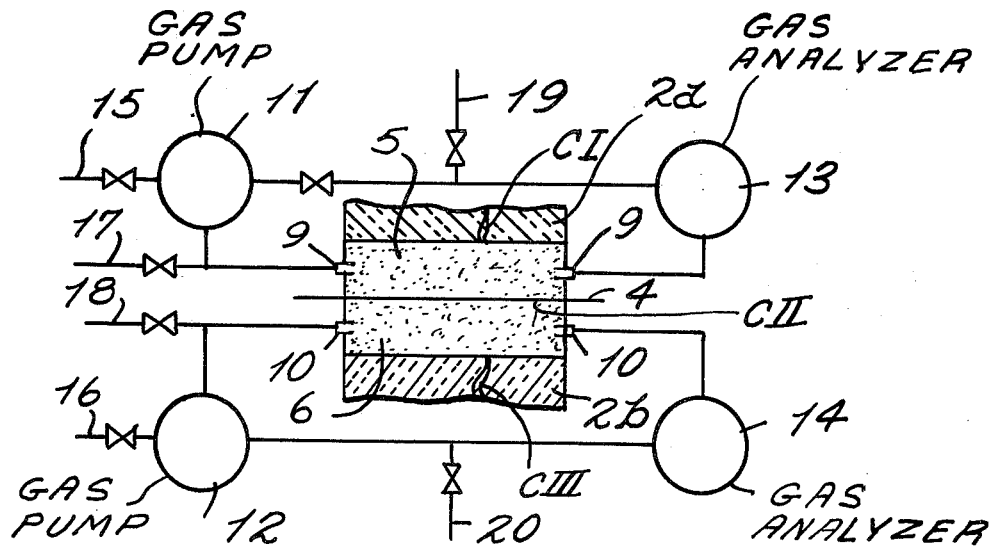
FIG. 4 is a block diagram showing the piping arrangement of the present invention wherein relationship between the construction of the heat insulating layers and the crack detecting mechanism is illustrated.

Referring now to FIG. 4, the primary layer 5 of gas permeable sheet material and the primary heat insulating layer 2a are located at the low temperature side of the secondary impermeable layer 4 while the secondary layer 6 of gas permeable sheet material and the secondary heat insulating layer 2b are located at the high temperature side of the secondary impermeable layer 4, and circulating gas feed pumps 11, 12 (serving also as gas suction pumps, respectively) and gas analyzing devices 13, 14 (including gas detecting means, respectively) are connected to the respective layers 5, 6 of gas permeable sheet material through the communicating pipes 9, 10, respectively. The above piping arrangement includes pipes 15, 16 for introducing inert gas or halogen gas into the layers 5, 6 and gas purging pipes 17, 18, 19, 20 are connected thereto as shown in FIG. 4.

At the time the primary layer 5 of gas permeable sheet material is applied to the tank, the secondary layer 6 of gas permeable sheet material is exhausted by the pump 12 to a predetermined vacuum. If the predetermined vacuum can be maintained in the layer 6, then it is proved that no cracks such as shown by CIII, CII in FIG. 4 exists in the secondary heat insulating layer 2b and the secondary impermeable layer 4.

If the above described vacuum can not be maintained, it shows that crack CIII or CII exists. Then, a small quantity of halogen vapor such as freon, for example, is introduced into the interior of the tank and the pump 12 is operated to extract gas through the secondary layer 6 of gas permeable sheet material and the extracted gas is applied to the gas analyzing device 14 so as to analyze the gas. If halogen is detected in the gas, then the existence of the crack CII in the secondary impermeable layer 4 is proved, so that the crack can be avoided.

At the time the primary heat insulating layer 2a and the primary impermeable layer 3 are applied to the surface of the primary layer 5 of gas permeable sheet material, halogen gas (freon, for example) is introduced into the primary layer 5 of gas permeable sheet material through the pipe 15 and a portable halogen detecting device is located on the surface of the primary impermeable layer 3 so as to carry out the detection of the existence of halogen gas. If the crack CI exists, then the halogen gas is detected so that the repair can be properly carried out. Similar detection can be carried out with respect to the secondary impermeable layer 4.

When the low temperature liquid is stored in the low temperature liquid storage tank of the internal heat insulating type as described above after completion thereof, nitrogen gas is circulated as the inert gas through the primary layer 5 of gas permeable sheet material and the secondary layer 6 of gas permeable sheet material through the pipes 15, 16 by the means of pumps 11, 12, respectively. Thus, any cracks CI, CII, if exist, can be easily and accurately detected by the gas analyzing devices 13, 14 connected in the circulating lines, respectively. Should any deficiency be detected, the low temperature liquid in the tank is removed therefrom to another place thereby permitting any accident to be prevented from occurring.

At the time of periodical inspection of the ship provided with the low temperature liquid storage tank described above, halogen gas is introduced into each of the ballast tanks $B_1$, $B_2$, and the gas extracted from the secondary layer 6 of gas permeable sheet material is subjected to the gas analyzing operation so that existence of the crack CIII is exactly detected without fail, thereby permitting the repair of the tank.

I claim:

1. An internally thermally insulated low temperature liquid storage tank with leakage detecting means, comprising:
   a tank shell;
   a liquid impermeable layer lining the tank shell;
   a layer of thermal insulation interposed between the liquid impermeable layer and the shell;
   a secondary liquid impermeable barrier layer provided in the layer of thermal insulation, intermediate the thickness of the thermal insulation;
   a first layer of gas permeable sheet material located within the layer of thermal insulation next to the side of the secondary liquid impermeable barrier which faces inside the tank;
   a second layer of gas permeable sheet material located within the layer of thermal insulation next to the side of the secondary liquid impermeable barrier which faces outside the tank;
   a plurality of gas impermeable partition members extending through the thickness of each layer of gas permeable sheet material and dividing the gas permeable sheet material into a plurality of compartments grouped in at least one set inside the secondary liquid impermeable barrier layer and at least another set outside the secondary liquid impermeable barrier layer;
   a plurality of conduit means extending through the partition members, each conduit means serving to intercommunicate the adjacent ones of the compartments of a set on a respective side of the secondary liquid impermeable barrier layer;
   means for pumping a supply of inert gas through selected ones of the respective sets of compartments via the respective conduit means and for collecting said gas thereafter;
   the collecting means including a gas analyzer means for detecting the presence in the collected inert gas of leakage from the inside of the tank through the first-mentioned liquid impermeable layer into said first gas permeable sheet within the respective set of compartments;
   the collecting means further including a gas analyzer means for detecting the presence in the collected inert gas of leakage from outside of the tank through the tank shell into said second gas permeable sheet within the respective set of compartments.

* * * * *